(12) United States Patent
Shaposhnikov

(10) Patent No.: US 10,643,455 B2
(45) Date of Patent: May 5, 2020

(54) SCHOOL EMERGENCY ARTIFICIAL INTELLIGENCE NOTIFICATION SYSTEM AND METHOD

(71) Applicant: FrandMe, Inc, Aventura, FL (US)

(72) Inventor: Dimitry Shaposhnikov, Hallandale, FL (US)

(73) Assignee: FRANDME, INC., Aventura, FL (US)

( * ) Notice: Subject to any disclaimer, the term of this patent is extended or adjusted under 35 U.S.C. 154(b) by 0 days.

(21) Appl. No.: 16/589,027

(22) Filed: Sep. 30, 2019

(65) Prior Publication Data

US 2020/0035085 A1 Jan. 30, 2020

Related U.S. Application Data

(63) Continuation-in-part of application No. 16/418,443, filed on May 21, 2019.
(Continued)

(51) Int. Cl.
*G08B 21/02* (2006.01)
*G08B 25/01* (2006.01)
(Continued)

(52) U.S. Cl.
CPC ........... *G08B 25/012* (2013.01); *G08B 21/02* (2013.01); *G08B 25/001* (2013.01); *G08B 25/10* (2013.01); *H04W 4/90* (2018.02)

(58) Field of Classification Search
CPC ............. H04M 11/04; H04M 1/72541; H04M 1/72552; H04M 2242/30; H04M 2250/10; H04M 2250/74; H04W 4/12; H04W 4/90; H04W 28/04; H04W 4/029; H04W 64/00; H04W 76/50; H04W 4/023; H04W 4/024; G08B 27/006; G08B 27/005;
(Continued)

(56) References Cited

U.S. PATENT DOCUMENTS 8,150,925 B2 * 4/2012 Zimmers ............... G08B 27/005
  709/206
8,489,063 B2 * 7/2013 Petite ...................... H04L 51/32
  455/404.1
(Continued)

*Primary Examiner* — Daniel Previl
(74) *Attorney, Agent, or Firm* — Mark C. Johnson; Johnson |Dalal

(57) ABSTRACT

A computer-implemented method of notifying persons of emergencies using artificial intelligence, wherein the first step includes providing at least one database storing multiple accounts thereon that are operably configured to be selectively hierarchically diminutively associated with another account thereon. The method also includes providing an artificial intelligence hardware component operably configured to generate and receive a recording data file that includes at least one of a sound, an audio, an image, generating the recording by the artificial intelligence hardware component, transmitting, through the artificial intelligence hardware component, the recording data file to a recording database for analyzing, analyzing the recording data file to determine the presence of an emergency event or a non-emergency event, and communicating an emergency response notification, upon determining the presence of the emergency event, to the first school user account and the plurality of teacher user accounts.

3 Claims, 11 Drawing Sheets

Related U.S. Application Data

(60) Provisional application No. 62/756,580, filed on Nov. 6, 2018, provisional application No. 62/739,041, filed on Sep. 28, 2018, provisional application No. 62/674,552, filed on May 21, 2018.

(51) Int. Cl.
*G08B 25/00* (2006.01)
*H04W 4/90* (2018.01)
*G08B 25/10* (2006.01)

(58) Field of Classification Search
CPC ....... G08B 25/016; G08B 7/066; H04L 45/22; H04L 29/08072; H04L 51/066; H04L 51/32; H04L 65/102; H04L 69/329; G01S 19/17; G06F 15/7875; G06F 16/24575; G06F 8/43; G06F 9/44505; G06F 9/451; G08G 1/0965; G08G 1/123; G08G 1/205; G06Q 10/08; H04H 20/24; H04H 20/42; H04H 20/59; H04H 2201/70; H04H 60/23; H04H 60/27

USPC .... 340/539.13, 546, 568.1, 531, 572.1, 463, 340/471, 506, 539.28, 426.18, 438, 988
See application file for complete search history.

(56) References Cited

U.S. PATENT DOCUMENTS

| | | | |
|---|---|---|---|
| 2004/0021582 A1* | 2/2004 | Ohdachi | G08B 27/006 340/988 |
| 2008/0034114 A1* | 2/2008 | Ducey | H04H 20/24 709/238 |
| 2008/0079581 A1* | 4/2008 | Price | G06Q 10/08 340/572.1 |
| 2008/0284587 A1* | 11/2008 | Saigh | H04M 1/72541 340/539.13 |
| 2012/0173700 A1* | 7/2012 | De Andrade Cajahyba | G06F 9/44505 709/224 |

* cited by examiner

200

300

800

900

1100

SCHOOL EMERGENCY ARTIFICIAL INTELLIGENCE NOTIFICATION SYSTEM AND METHOD

CROSS-REFERENCE TO RELATED APPLICATION

This application claims priority to U.S. Provisional Patent Application No. 62/739,041, filed Sep. 28, 2018, and is also a continuation-in-part to U.S. Nonprovisional patent application Ser. No. 16/418,443, filed May 21, 2019, which claims priority to U.S. Provisional Patent Application No. 62/756,580, filed Nov. 6, 2018, and U.S. Provisional Patent Application No. 62/674,552, filed May 21, 2018 the entirety of both are incorporated by reference.

FIELD OF THE INVENTION

The present invention relates generally to school emergency notification systems and methods, and, more particularly, relates to an emergency notification system and method utilizing artificial intelligence.

BACKGROUND OF THE INVENTION

Typically, schools and the associated staff, students, parents, and local emergency response units are in total confusion during an emergency event, such has a school shooting, inclement weather, flood, and power outage. The school, and administrators in charge, are required to contact the relatives of the students during such an emergency event. However, this is also the time that communication lines are full, and time is scarce for communications with off-campus parents. The administrators are sufficiently busy trying to assess the emergency event and contact the appropriate emergency response units.

Often, identifying the exact location of the teachers and students trapped in the school during the emergency event is problematic. The emergency response units may simply roam the school audibly calling out instructions, or randomly calling the teachers and students to evacuate at a specific location of the school. Also, it is often a "hero" that has to assume the responsibilities of neutralizing the emergency event and evacuating/protecting the student and teachers. This is on-and-off; and further is inefficient when dealing with a large school having thousands of students.

Therefore, a need exists to overcome the problems with the prior art as discussed above.

SUMMARY OF THE INVENTION

The invention provides a web-based school emergency notification system and method that overcomes the hereinafore-mentioned disadvantages of the heretofore-known devices and methods of this general type and that effectively, quickly, and efficiently notifies emergency responders of a threat or emergency utilizing one or more artificial intelligence component(s). Although the invention is illustrated and described herein as embodied in a school emergency notification system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

For purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DESCRIPTION OF THE INVENTION

Figure 1:
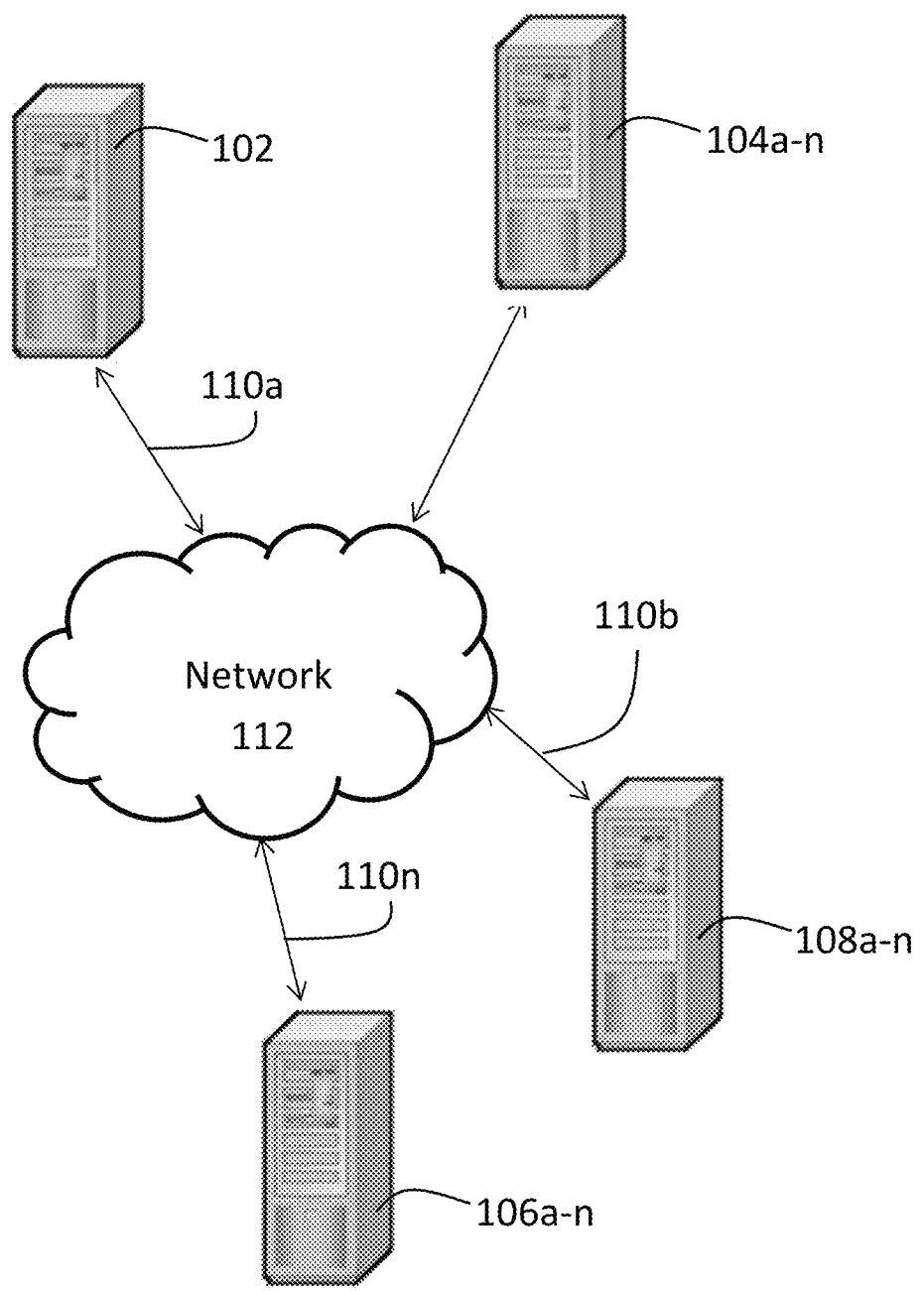
FIG. 1 is a block diagram showing an exemplary network in accordance with one embodiment of the present invention.

The invention provides a school emergency artificial intelligence ("AI") notification system and method that overcomes the hereinafore-mentioned disadvantages of the heretofore-known devices and methods of this general type. With the foregoing and other objects in view, there is provided, in accordance with the invention, a computer-implemented school emergency artificial intelligence notification system and method that includes providing, at the at least one server having a processor, at least one database storing a first school user account of a first school user, a first teacher user account of a first teacher user logically and selectively hierarchically diminutively associated with the first school user account, and a first student user account of a first student user logically and selectively hierarchically diminutively associated with the first school user account, the first teacher user account of a plurality of teacher user accounts operably configured to be selectively hierarchically diminutively associated with the first school user account and the first student user account of a plurality of student user accounts operably configured to be selectively hierarchically diminutively associated with the first teacher user account. The method may also include providing an artificial intelligence hardware component operably configured to generate a recording data file that includes at least one of a sound, an audio, an image, and a video. The method may also include receiving the at least one of the sound, audio, image, and video at the artificial intelligence hardware component. The method may also include generating the recording by the artificial intelligence hardware component and transmitting, through the artificial intelligence hardware component, the recording data file to a recording database for analyzing. The method may also include analyzing the recording data file to determine the presence of an emergency event or a non-emergency event and communicating an emergency response notification, upon determining the presence of the emergency event, to the first school user account and the plurality of teacher user accounts.

Although the invention is illustrated and described herein as embodied in a school emergency artificial intelligence notification system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

As used herein, the term "artificial intelligence" applies to the development of a computer system's ability to perform tasks that normally require human intelligence. For purposes of this invention, the term generally may include, but is not limited to: 1) speech, voice, noise, audio, and sound recognition, 2) facial recognition, 3) fingerprint recognition, and 4) decision making.

While the specification concludes with exemplary claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient school emergency artificial intelligence notification system and method. Specifically, the system and method may be operated over a network 100 includes connections 110*a-n*, which are the medium used to provide communications links between various devices and computers connected together within the system 100. The connections 110*a-n* may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 112 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 112 also may be implemented as a number of different types of networks, such as for example, an Intranet, a local area network (LAN), or a wide area network (WAN). FIG. 1 is intended as an example, and not as an architectural limitation for the present invention. The system 100 and/or the network 112 may include additional servers and other devices and entities not shown.

In one embodiment, the system 100 permits users to create a channel, via a single user-friendly interface, as will be described herein below in more detail. Embodiments of the system 100 are configured such that a single input into the editing application interface may apply to an associated channel. As such, the system 100 is operably configured to associate a user's channel, e.g., a school, with "sub-channel" member(s), e.g., teachers, whereby any sub-channel member may associate one or more third-party member(s), e.g., students, with said sub-channel. Updates on a channel owner's page may then automatically notify sub-channel member(s) and/or third-party member(s). An exemplary screen shot 200 of a sub-channel member registering under the channel owner's account, wherein the email associated with the link sent from the channel owner can be seen in FIG. 2. Said another way, each school may simultaneously send updates and notifications to both sub-channel members and third-party members through, for example, an invitation to a sub-channel member, wherein the sub-channel member's email is pre-populated into the sub-channel member invitation field 202 to associate it with the user's channel.

As such, a computer-implemented method for notifying persons and/or entities of an emergency is disclosed and may include, from an abstract level, an administrative server 102 where user accounts are housed and where information and data may be received at or communicated from, one or more school users 104*a-n* (wherein "n" represents any number greater than one), one or more teacher users 106*a-n*, and one or more school users 108*a-n*. While the users are represented in FIG. 1 as servers or computers, those of skill in the art will appreciate that any computing device may suffice to carry out the process of the present invention. Specifically, the process may begin with providing, at the at least one server, e.g., server 102, at least one database storing a first school user account 104*a* of a first school user. The database also stores a first teacher user account 106*a* of the first teacher user that is logically and selectively hierarchically diminutively associated with the first school user account. Said another way, the teacher user account 104*a* is logically associated with the first school user account through, for example, an array based on computer logic. The teacher user account 104*a* is selectively hierarchically diminutively associated with the first school user account in that the school user may select which teachers are to be associated with the school user account and that the teacher user will only have certain permissions (based on the school's discretion) to modify, add, delete, receive, and/or communicate certain information or data to other users.

A first student user account of a first student user may also be logically and selectively hierarchically diminutively associated with the first school user account. Said another way, the student user account 108*a* is logically associated with the first teacher user account through, for example, an array based on computer logic. The student user account 108*a* is selectively hierarchically diminutively associated with the first school user account in that the teacher user may select which students are to be associated with the teacher user account and that the student user will only have certain permissions (based on the teacher's discretion) to modify, add, delete, receive, and/or communicate certain information or data to other users. The first teacher user account of the plurality of teacher user accounts is operably configured to be selectively hierarchically diminutively associated with the first school user account and the first student user account of a plurality of student user accounts operably are configured to be selectively hierarchically diminutively associated with the first teacher user account, with the above-described limitations, restrictions, and/or permissions.

Figure 3:
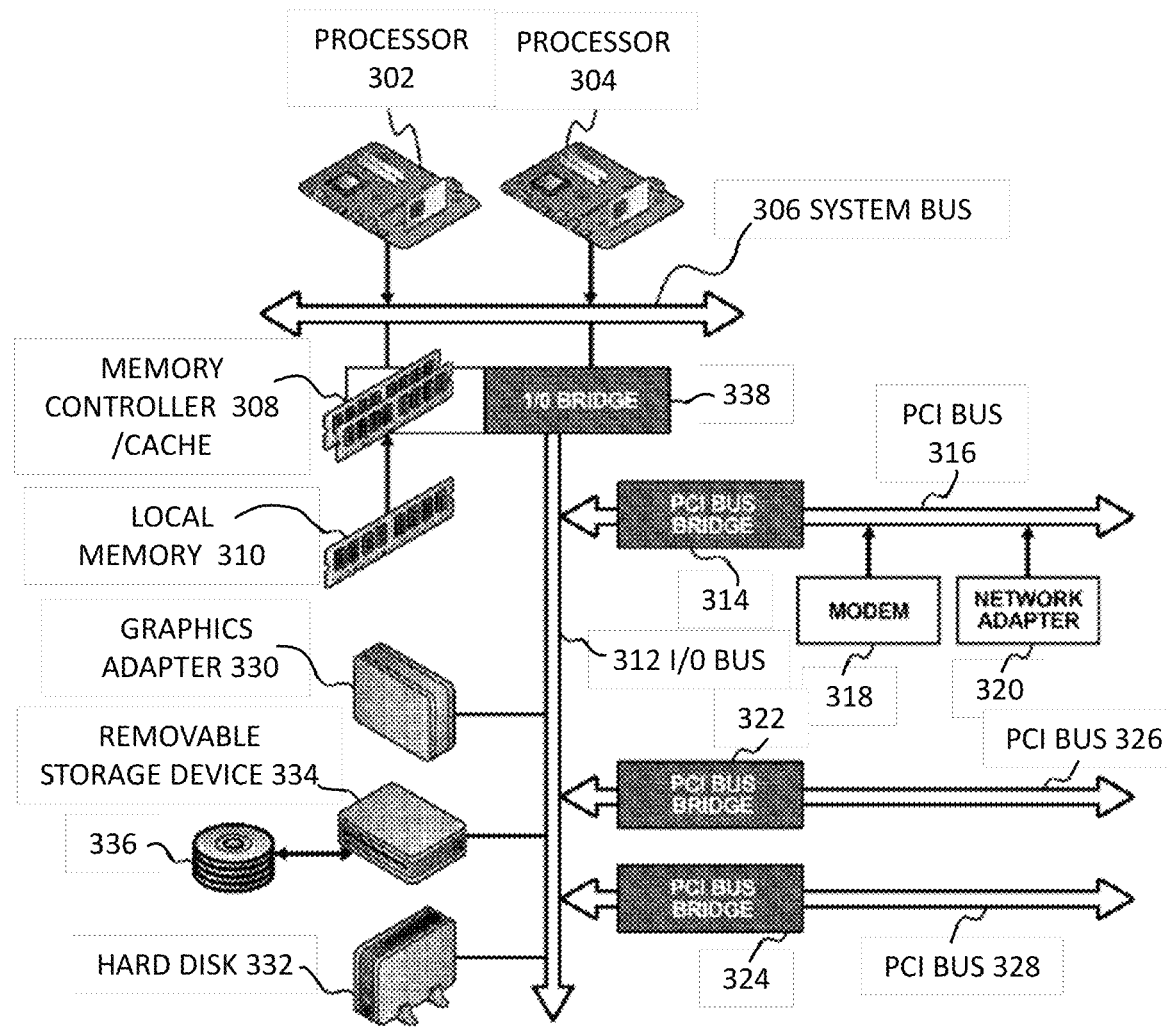
FIG. 3 is a block diagram of an exemplary data processing system, in accordance with one embodiment of the present invention.

Referring to FIG. 3, a block diagram of a data processing system 300 that may be implemented as a server, such as the personal computer, or implemented as a mobile electronic computing device, recording device, or other computing device coupled to a network 112 (e.g., the Internet), as shown in FIG. 1, in accordance with one embodiment of the present invention. The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location for the databased housing user account information and data.

Peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIG. 1 may be provided through the modem 318 and network adapter 320 connected to PCI local bus 316 through add-in boards. Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The processes explained in detail herein are implemented and/or embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform the features of the emergency notification and communication process in the system as described herein.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile (non-transitory) memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

The network hardware components and system architecture for embodiments of the emergency notification and communication system have been described above. Although the figures depicted herein show a specific order of executing the process steps, the order of executing the steps may be changed relative to the order shown in certain embodiments. Also, two or more steps described as occurring in succession may be executed concurrently or with partial concurrence in some embodiments. Certain steps may also be omitted for the sake of brevity. In some embodiments, some or all of the process steps described herein can be combined into a single process step.

As part of the school user account initiation or registration process, the school user will create a "channel," or dedicated Internet URL subdomain that is also generated in a hierarchal configuration. Included in this school-user account registration process is the creation of a username and a password associated with said account which may be received, by the server 102. In other words, the school user may login to its account, hosted by the server 102. A log-in screen may display user-input fields for inputting the username and/or password information. Alternatively, if the school user has not yet created an account, the school user may first click on the "create an account" button to create its account and interact with its account by, for example, providing various inputs such as profile information and other information to be associated with the account.

As used herein, the channel created by each school user is associated with and managed through such school-user's account. Further, the school user may edit the user-interface of the sub-domain/channel information associated with its account. The teacher users and student users are diminutive with respect to the student user in that that these users are intended to be end-users of the school-user account, and may be only permitted to be viewers, members of the school-user's channel, but are not provided with editing rights and/or other channel control privileges that are reserved for the school-user account. User accounts are hosted by the server 102 allow users to create as well as join other user channels. In other embodiments, other diminutive or superior users may be created, e.g., in the following order, super intendants of school district users, school users, teacher users, student users, and parent users.

Once logged into his/her user account, the users may be directed to a main or home page. For example, the home page or user interface of a school user may be seen in FIG. 4, wherein the school user may interact with the server 102. It should be understood that although the singular term "server" is used herein for the sake of brevity, storage may occur at a database (or multiple databases) associated with the server and/or may be stored across more than one server. It should also be understood that even where the singular term "server" is used, processing steps may in some embodiments may be distributed across more than one server. In one embodiment, the home page may include a side bar 402 from which various options may be selected. In a further embodiment, the side bar may include, for example, icons which, responsive to a user-selection of the icon, may allow the school user to view all channels, create a new subchannel, show my channels, find friends/teachers, view channel notifications, select a current channel, view member chats, edit profile information, and the like.

Figure 2:
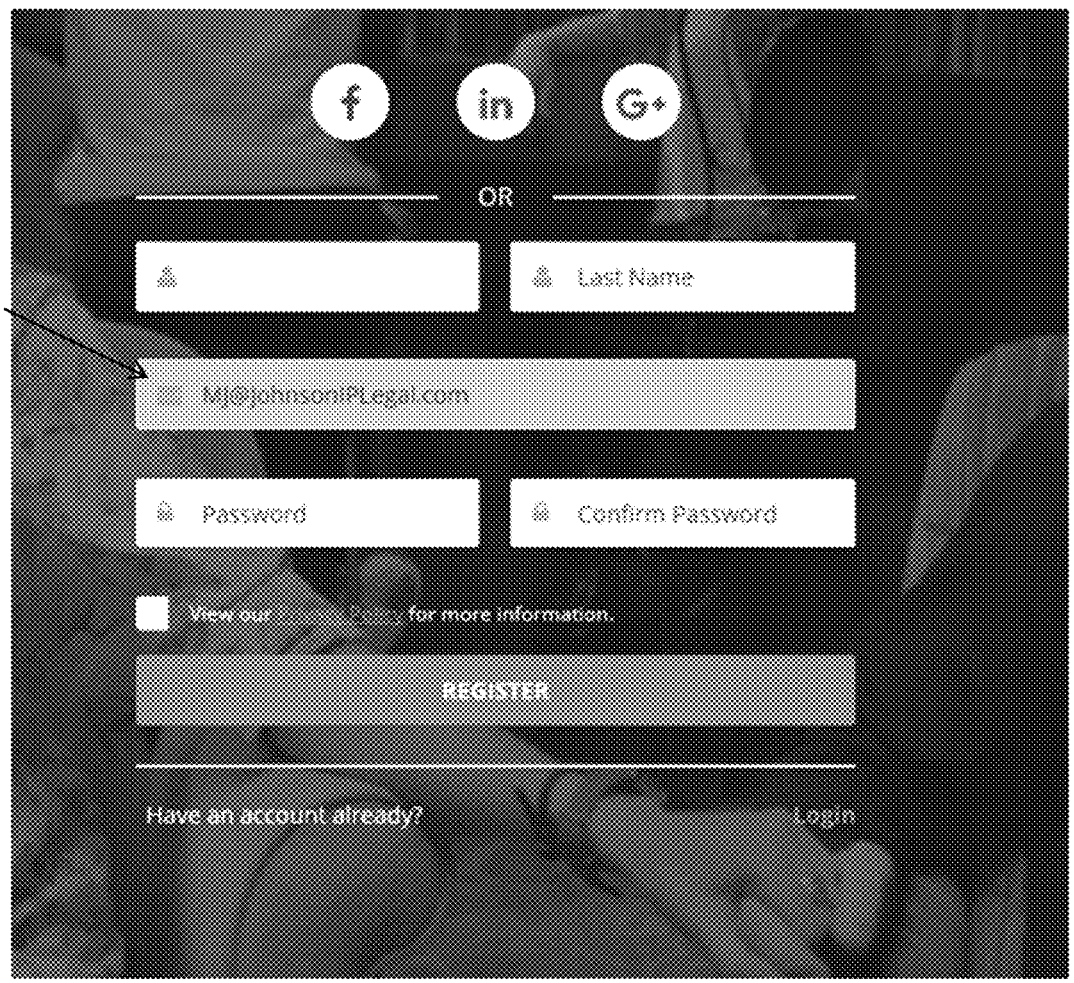
FIGS. 2, 4-8, and 11 are exemplary screen shots of a user interface employed with carrying out a school emergency artificial intelligence notification system and method, in accordance with one embodiment of the present invention.
Figure 4:
Figure 5:
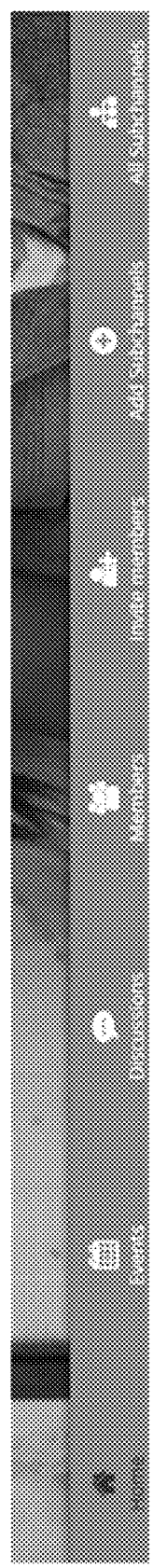
Figure 6:
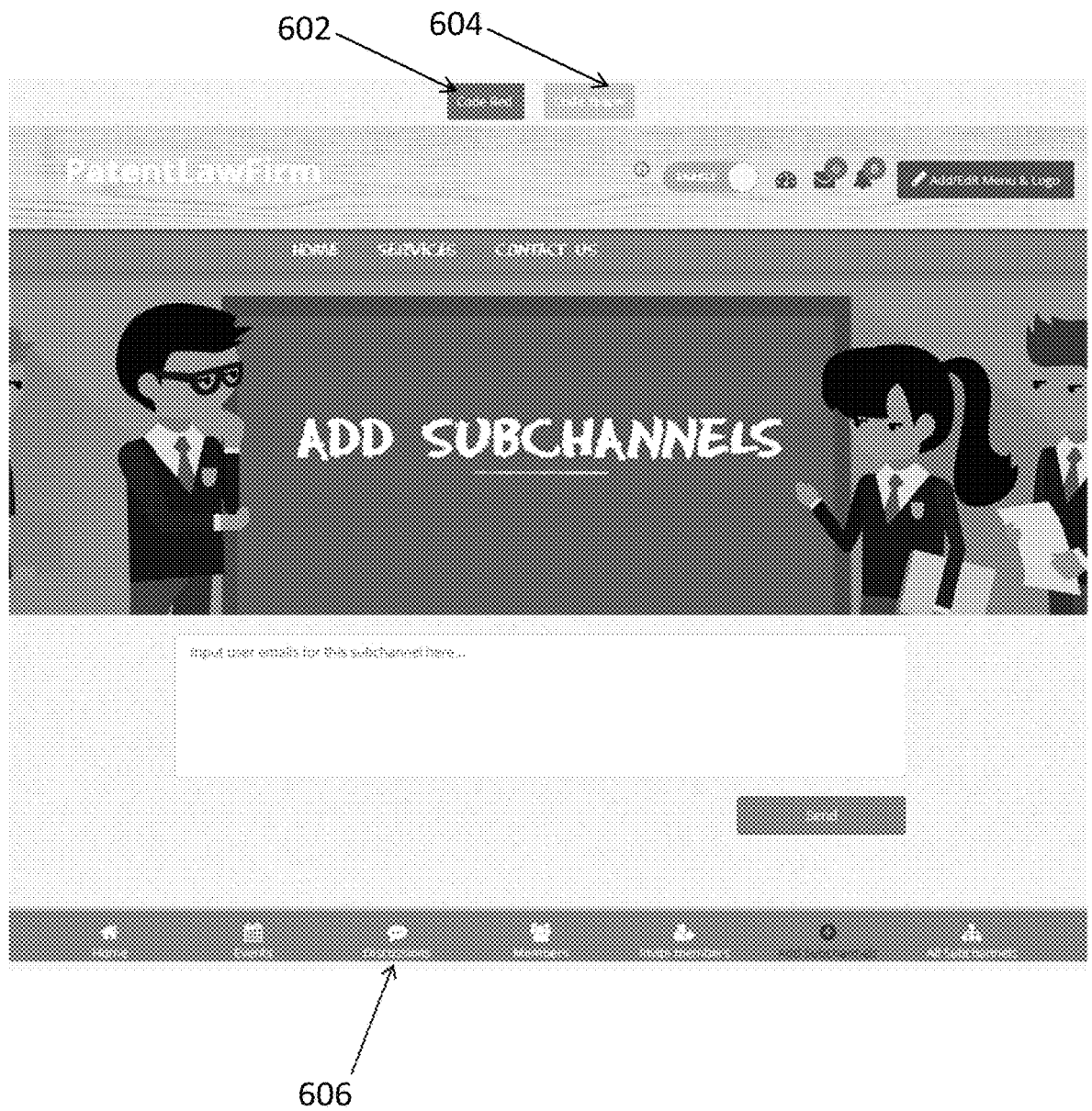

With reference to FIG. 5, which is a close-up view of a bottom bar in FIG. 4, the school user may select an option to create a new subchannel that will associate the one or more teacher user accounts of one or more teacher users that will be logically and selectively hierarchically diminutively associated with the first school user account. When selecting the add subchannel icon, a user interface as shown in FIG. 6 will be presented to the school for insertion of one or more teacher user account emails that will be associated with the user account when the invitation is accepted, and the teacher users register (as shown in FIG. 2). The subchannel or channel creating process can be described as a modifiable HTML web page that is independently dedicated to a particular user's account.

In one embodiment, the user account interfaces, templating methods, and modification/editing methods, as discussed in U.S. Pat. No. 9,910,682, which is incorporated herein by reference, may be employed.

Figure 7:
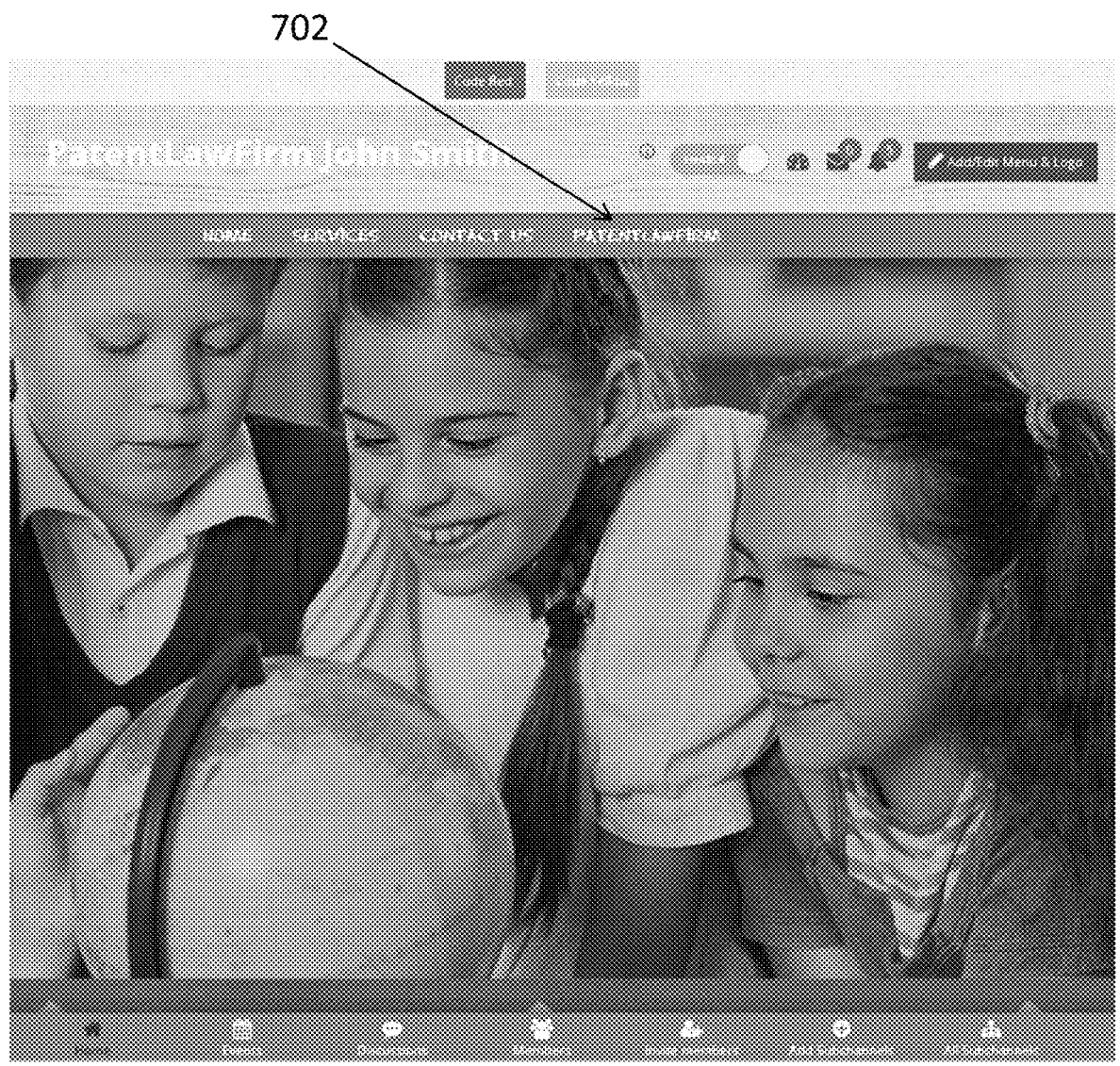

Still referring to FIG. 6, the user interface of a school user may include a "Code Red" icon 602 and a "Code Yellow" icon 604. The "Code Red" and/or the "Code Yellow" icon associated with an emergency event, e.g., a stabbing or fire, when initiated by the school user, may send out a notification of the same, via SMS, email, or other communication means, to one or more selectable teacher user(s) and/or school user(s) over a wide-scale basis, i.e., emailing the group of diminutively associated users. Said another way, the school user account/channel may be operably configured to automatically send a notification of the Code Red or Code Yellow to each of the plurality of teacher user(s) or student user(s) as a result of the selection of the same. In other embodiments, as shown in FIG. 7, the same Code Red and/or Code Yellow icons are present on the user interface for the teacher user. In one embodiment, the at least one server 102 may receive a first emergency notification (as a result of the user selection a Code Red or Code Yellow) for an emergency event, e.g., shooting, from the first teacher user. Upon receipt, the school user is also notified, wherein the school user may approve the wire-spread or selective distribution of the emergency notification to other school user(s), teacher user(s), and/or student user(s).

Additionally, a second emergency notification for the emergency event by a second teacher user may also be received by the server and/or school user. Further, a third emergency notification for the emergency event by a third teacher user may also be received by the server. In one embodiment, upon receipt of the third teacher emergency notification, a wide-spread or group notification is sent out to all associated and/or selectable teacher-user accounts or student-user accounts. Said another way, the server may communicate an emergency response notification, upon receipt of the third emergency notification for the emergency event to the plurality of teacher user accounts and the plurality of student user accounts for corrective or responsive action. In other embodiments, one or more emergency first responders may also be communicatively coupled to the network. The response notification system of the present invention therefore may create a three-tiered notification system that is based on a hierarchal relationship.

Similar to the school-user interface, the teacher user will also associate one or more student user accounts in accordance with the present invention by clicking the "Add Subchannels" icon, wherein one or more email addresses will be inserted into the appropriate field for email, SMS, or other means. The teacher-user interface may also include a link 702 to the school user web interface where postings or other information may be viewed. In some embodiments, when the student users are associated with the teacher user account, they are similarly associated with the school user account that is associated with the teacher user account in which the student user is registering for. Unlike the school and teacher-account interfaces, the student user web interface may not include the "Add Subchannel" link.

Figure 8:
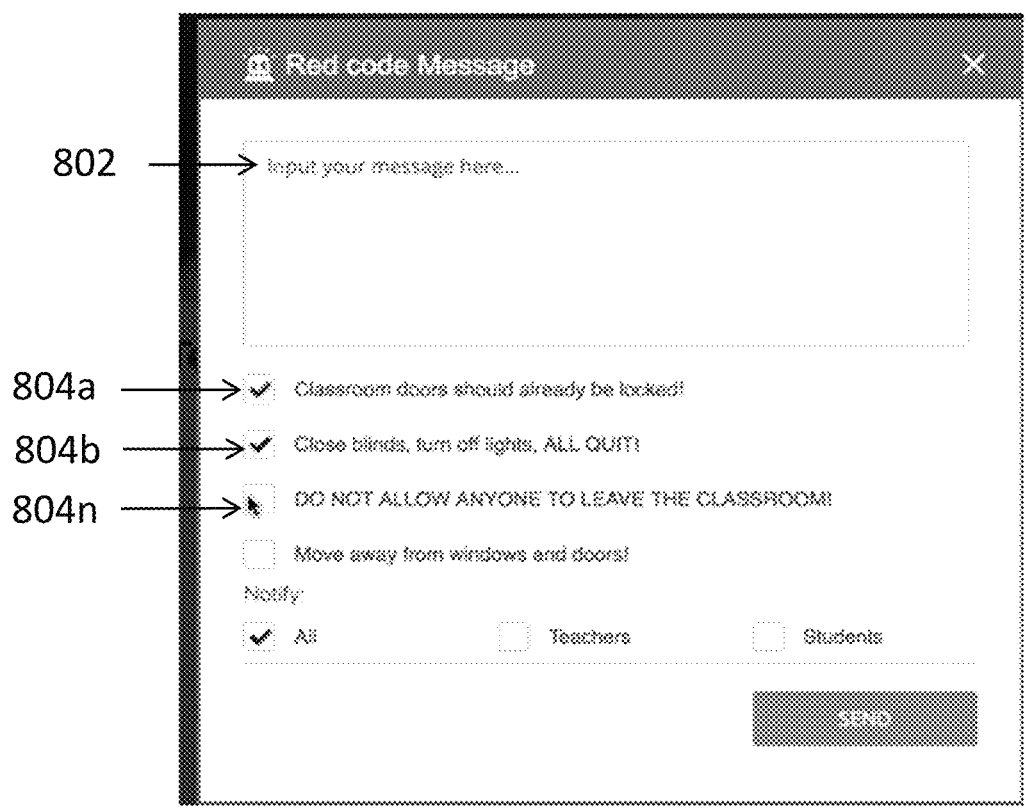

Similar to the school-user interface, when a school user clicks on the "Red Code" icon 602 shown in FIG. 6, a user interface 800 will be presented to the user, as shown in FIG. 8. The interface 800 will allow the school user to type in a custom message 802 and check off one or more instructional message boxes 804$a$-$n$. The message 802, along with the instructions 804$a$-$n$, will be distributed via a wide-spread or group notification which will be sent out to all associated and/or selectable teacher-user accounts or student-user accounts. It should be understood that the instructional boxes 804$a$-$n$ can be customized by each individual school according to various school needs.

The present invention utilizes at least one artificial intelligence hardware component which is communicatively coupled to the school emergency artificial intelligence notification system and method described in system 100 above. Specifically, the system and method utilizing at least one artificial intelligence hardware component may be operated over a network 900 includes connections 914$a$-$n$, which are the medium used to provide communications links between various devices and computers connected together within the system 900. The connections 914$a$-$n$ may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

Figure 9:
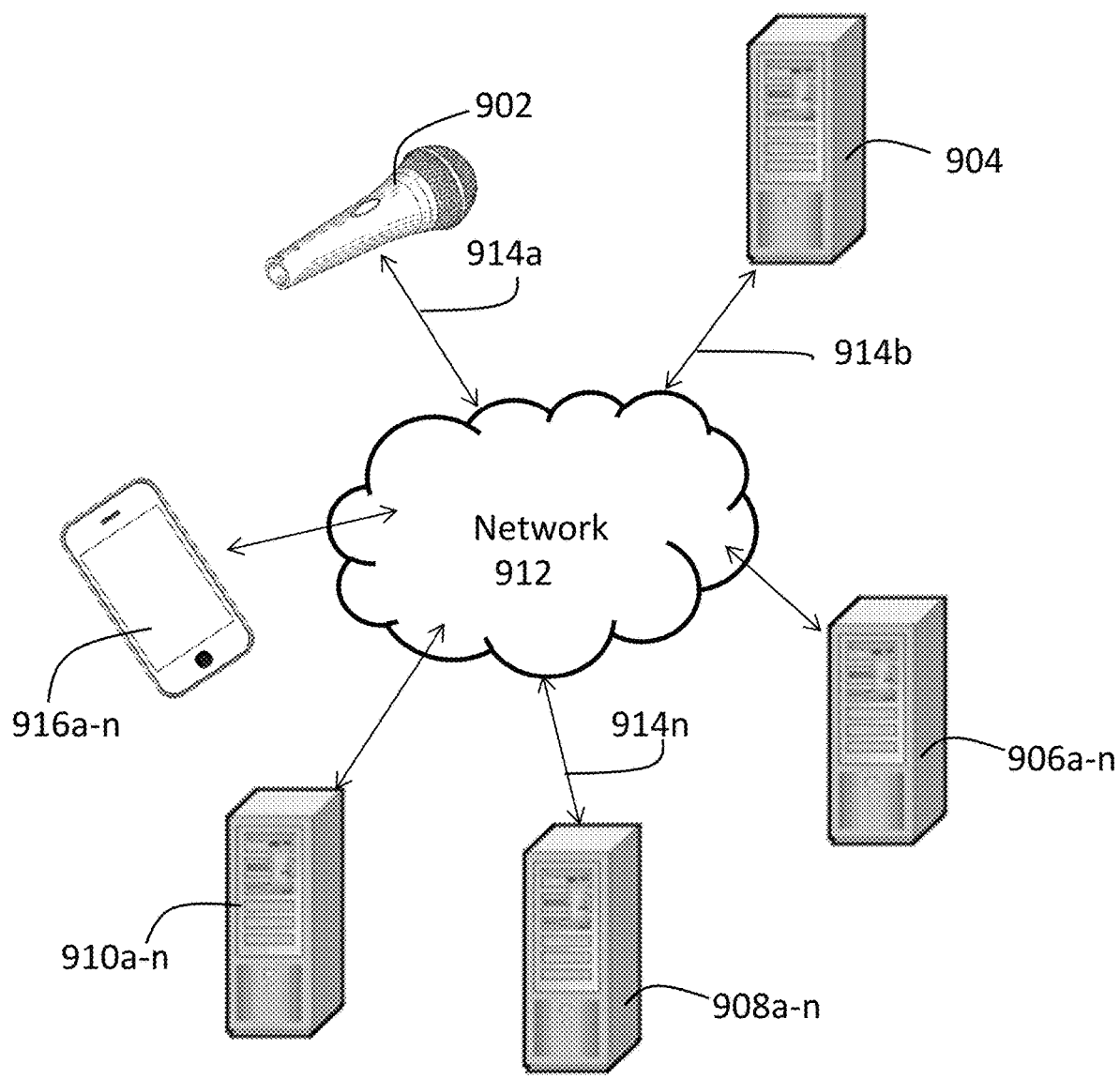
FIG. 9 is another block diagram showing an exemplary network in accordance with one embodiment of the present invention.

In the depicted example, the network 912 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 912 also may be implemented as a number of different types of networks, such as for example, an Intranet, a local area network (LAN), or a wide area network (WAN). FIG. 9 is intended as an example, and not as an architectural limitation for the present invention. The system 900 and/or the network 912 may include additional servers and other devices and entities not shown.

In one embodiment, the system 900 may incorporate the hierarchically diminutively associated channel notification system described above in system 100. As such, system 900 is likewise operably configured to associate a user's channel, e.g., a school, with "sub-channel" member(s), e.g., teachers, whereby any sub-channel member may associate one or more third-party member(s), e.g., students, with said sub-channel. Emergency updates on a channel owner's page may then automatically notify sub-channel member(s) and/or third-party member(s).

Thus, a computer-implemented method for notifying persons and/or entities of an emergency is disclosed and may include, from an abstract level, an administrative server 904 where user accounts are housed and where information and data may be received at or communicated from, one or more school users 906$a$-$n$, wherein "n" represents any number greater than 1, one or more teacher users 908$a$-$n$, and one or more student users 910$a$-$n$. While most of the users are represented in FIG. 9 as servers or computers, those of skill in the art will appreciate that any computing device may suffice to carry out the process of the present invention, such as a mobile cellular device as depicted by users 916$a$-$n$. Specifically, the process may begin with providing, at the at least one server, e.g., server 904, at least one database storing a first school user account 906$a$ of a first school user. The database also stores a first teacher user account 908$a$ of the first teacher user that is logically and selectively hierarchically diminutively associated with the first school user account. Said another way, the teacher user account 908$a$ is logically associated with the first school user account through, for example, an array based on computer logic. The teacher user account 908$a$ is selectively hierarchically diminutively associated with the first school user account in that the school user may select which teachers are to be associated with the school user account and that the teacher user will only have certain permissions (based on the school's discretion) to modify, add, delete, receive, and/or communicate certain information or data to other users.

A first student user account of a first student user may also be logically and selectively hierarchically diminutively associated with the first school user account. Said another way, the student user account 910$a$ is logically associated with the first teacher user account through, for example, an array based on computer logic. The student user account 910$a$ is selectively hierarchically diminutively associated with the first school user account in that the teacher user may select which students are to be associated with the teacher user account and that the student user will only have certain permissions (based on the teacher's discretion) to modify, add, delete, receive, and/or communicate certain information or data to other users. The first teacher user account of the plurality of teacher user accounts is operably configured to be selectively hierarchically diminutively associated with the first school user account and the first student user account of a plurality of student user accounts operably are configured to be selectively hierarchically diminutively associated with the first teacher user account, with the above-described limitations, restrictions, and/or permissions.

Referring back to FIG. 3, a block diagram of a data processing system 300 that may be implemented as a server, such as the personal computer, or implemented as a mobile electronic computing device, recording device, or other computing device coupled to a network 912 (e.g., the Internet), as shown in FIG. 9, in accordance with one embodiment of the present invention. Please refer above for a detailed description of the data processing system 300.

The artificial intelligence hardware component 902 comprises a recording device able to receive at least a sound, an audio, an image, and/or a video. FIG. 9 shows an embodiment of the present invention demonstrating several advantageous features, but, as will be described below, the invention can be provided in several forms, devices, combinations of features and components, and varying numbers and functions of the components. The first example of the artificial intelligence hardware component, as shown in FIG. 9, comprises a microphone. In this embodiment, the recording device(s) will be incorporated into to the system 900. The recording device(s) will be placed throughout the vicinity of the school and pick up audio, sound, speech, images, videos, and noise. The artificial intelligence hardware component 902 may be able to recognize common audio sounds associated with emergency scenarios; e.g., the sound of gunshots, alarm sounds, the word "shooter," or multiple screams; or, in other embodiments, the artificial intelligence hardware component 902 may comprise a different recording device and may be able to detect faces of known criminals through image or video capture. In other embodiments, the artificial intelligence hardware component may be a camera, a video tape recorder, or any combination of any of the named devices.

More specifically, the artificial intelligence hardware component receives at least a sound, an audio, an image, and/or a video and generates a recording data file. The recording data file may be transmitted, through the artificial intelligence hardware component and utilizing network 912, to a recording database for analyzing. It should be understood that although the singular term "recording database" is used herein for the sake of brevity, storage may occur at a server (or multiple servers) or a database (or multiple databases) associated with the artificial intelligence hardware component and/or may be stored across more than one artificial intelligence hardware component. Additionally, the recording database may be resident on the artificial intelligence hardware component itself or it may be located on a server (or multiple servers), i.e. the administrative server 904, that is communicatively coupled to the artificial intelligence hardware component 902 over network 912. In one embodiment, the recording database may be the same database as the at least one database storing the first user account of a first school user, a first teacher user account of a first teacher user logically and selectively hierarchically diminutively associated with the first school user account, and a first student user account of a first student user logically and selectively hierarchically diminutively associated with the first school user account, the first teacher user account of a plurality of teacher user accounts operably configured to be selectively hierarchically diminutively associated with the first school user account and the first student user account of a plurality of student user accounts operably configured to be selectively hierarchically diminutively associated with the first teacher user account.

The recording database stores at least one table comprising a plurality of recording data files, each respectively having separate characteristics, wherein the table is organized by a hierarchy of priority codes associated to each comparable recording data file. The recording database is operably configured to analyze and compare the individual characteristics of the received recording data file to the plurality of recording data files contained within at least one table. The recording database then finds the most similar recording data file and categorizes the received recording data file according to the table. For example, the recording database may compare the received recording data file's sound amplifications to the plurality of recording data files within the table to categorize the received recording data file as, for example, a gunshot. The recording database then determines the priority code of the categorization and thereby determines the presence of an emergency event or a non-emergency event. If the presence of an emergency event is detected, the recording database will communicate an emergency response notification to the first school user account and the plurality of teacher user accounts.

In one embodiment of the present invention, upon the determination of the presence of an emergency event by the recording database and receipt by the administrative server 904 of a third notification of the emergency event by a third teacher user, system 900 will send, using network 912, the artificial intelligence hardware component 902 an emergency signal. The communicated emergency signal may command the artificial intelligence hardware component to dial the school's designated local police station using network 912 and notify the police department to dispatch officers to the school via phone call, SMS, email, or other communication means.

Figure 10:
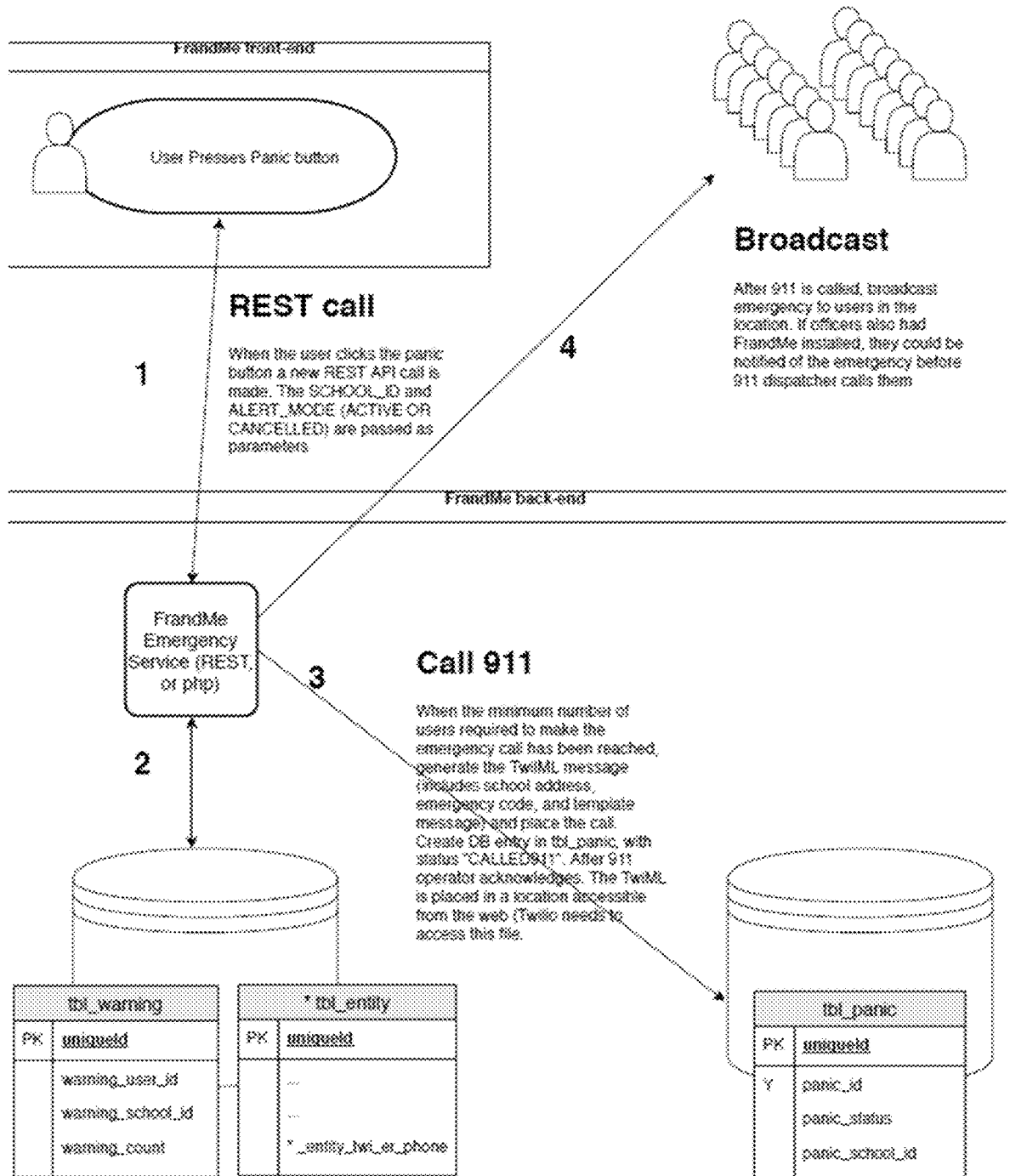
FIG. 10 is another block diagram showing an exemplary network in accordance with one embodiment of the present invention.

In another embodiment of the present invention, best depicted in FIG. 10, the artificial intelligence hardware component comprises a panic button. When a school user or a teacher user presses the panic button, an emergency signal is generated and sent, utilizing the network 912, to the administrative server 904. Upon receipt by the administrative server 904 of the minimum number of notifications of the emergency event by the minimum number of school users or teacher users required, the artificial intelligence hardware component generates a message including the school address, an emergency code, and a template message. The artificial hardware component then communicates the message, utilizing network 912, to the school's associated local police station via phone call, SMS, email, or other communication means. After the police phone call is made, system 900 may distribute the emergency notification message to the associated hierarchically diminutive users.

In other embodiments, upon receipt by the administrative server 904 of a third notification of the emergency event by a third teacher user, the system's artificial intelligence hardware component will utilize system 900 to automatically send a notification to the school's associated local police station. The notification of same will be automatically sent to the police station via phone call, SMS, email, or other communication means. This notification will inform the police department to dispatch officers to the school. Additionally, the system's artificial intelligence hardware component will read the message 802 along with any instructions 804*a*-*n* input by the school user in interface 800 to the dispatcher.

In other embodiments, a plurality of artificial intelligence hardware components will be incorporated into to the system 900 comprising recording devices. The artificial intelligence hardware components will function operatively the same as artificial intelligence hardware component 902 discussed previously. The artificial intelligence hardware components will also receive at least a sound, an audio, an image, and/or a video and generate recording data files. The recording data files may be transmitted, through the artificial intelligence hardware components and utilizing network 912, to a recording database for analyzing. The recording database may be resident on the artificial intelligence hardware components themselves or it may be located on a server (or multiple servers), i.e. the administrative server 904, that is communicatively coupled to the artificial intelligence hardware components over network 912. The recording database will determine the presence of an emergency event or a non-emergency event utilizing the method discussed previously. Upon the determination of the presence of an emergency event by the recording database and receipt by the administrative server 904 of a third notification of the emergency event by a third artificial intelligence hardware component, system 900 will send, using network 912, the school user(s) 906a-n an emergency signal via phone call, SMS, email, or other communication means. The communicated emergency signal may notify the school user that the presence of an emergency event has been confirmed by at least three artificial intelligence hardware components.

The artificial intelligence hardware components and system architecture for embodiments of the school emergency artificial intelligence notification system and method have been described above. Although the figures depicted herein show a specific order of executing the process steps, the order of executing the steps may be changed relative to the order shown in certain embodiments. Also, two or more steps described as occurring in succession may be executed concurrently or with partial concurrence in some embodiments. Certain steps may also be omitted for the sake of brevity. In some embodiments, some or all of the process steps described herein can be combined into a single process step.

Figure 11:
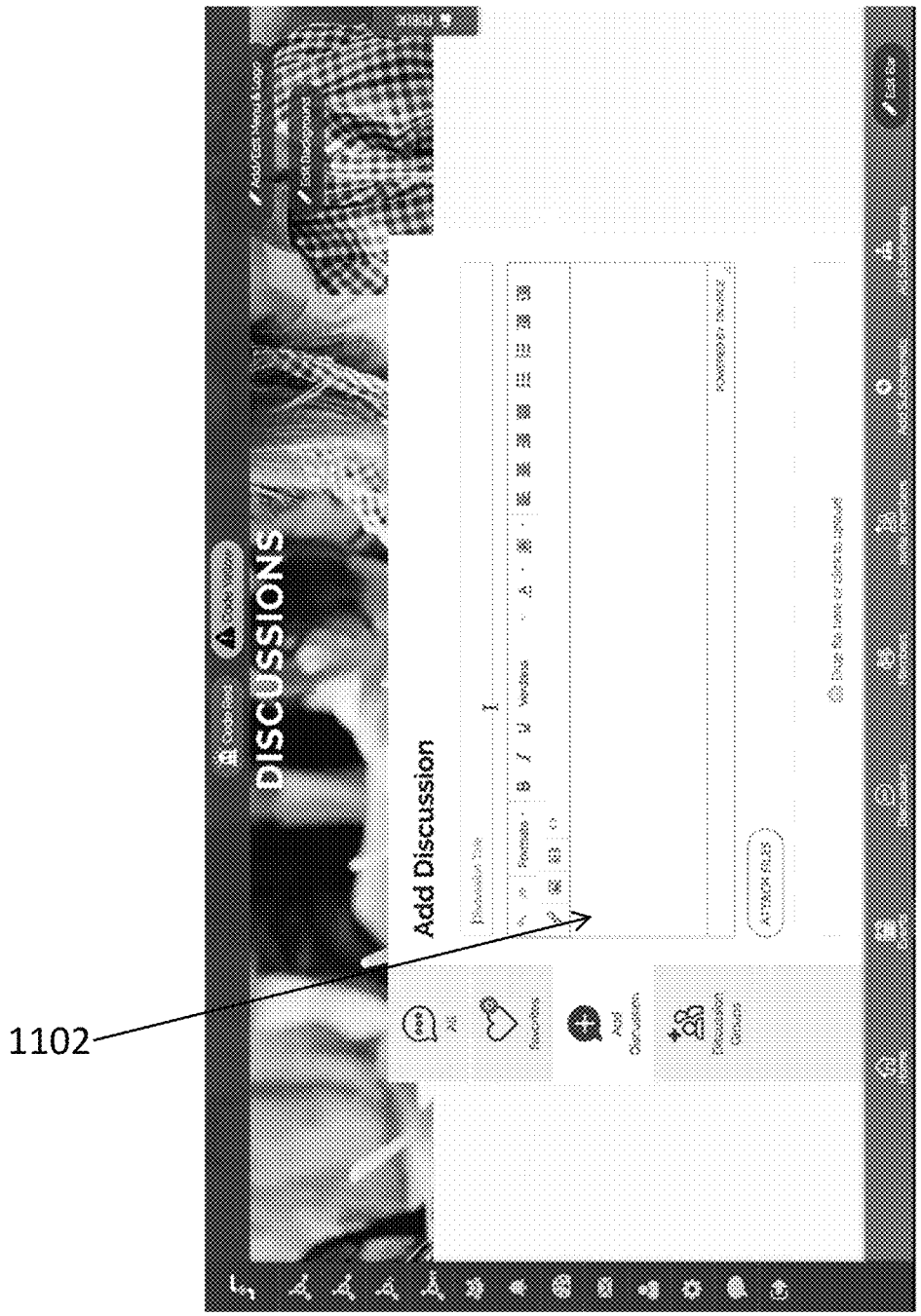

With reference to FIG. 6, the school user may select the "Discussions" icon 606 from the toolbar that will present user interface 1100 to the user, as depicted in FIG. 11. Interface 1100 will allow the school user to distribute a customizable message 1102 to one or more associated sub-channel member(s) and/or third-party member(s), e.g., parents. Upon initiation by the school user, the system's artificial intelligence hardware component may then automatically send out a notification of the message 1102, via SMS, email, or other communication means, to one or more selectable teacher user(s), school user(s), and/or third-party user(s) over a wide-scale basis, i.e., emailing the group of diminutively associated users. In one embodiment, the artificial intelligence hardware component will also translate message 1102 into several different languages.

What is claimed is:

1. A computer-implemented method of notifying persons of emergencies:
   providing, at the at least one server having a processor, at least one database storing a first school user account of a first school user, a first teacher user account of a first teacher user logically and selectively hierarchically diminutively associated with the first school user account, and a first student user account of a first student user logically and selectively hierarchically diminutively associated with the first school user account, the first teacher user account forming part of a plurality of teacher user accounts operably configured to be selectively hierarchically diminutively associated with the first school user account and the first student user account forming part of a plurality of student user accounts operably configured to be selectively hierarchically diminutively associated with the first teacher user account;
   providing an artificial intelligence hardware component operably configured to generate a recording data file that includes at least one of a sound, an audio, an image, and a video;
   receiving the at least one of the sound, audio, image, and video at the artificial intelligence hardware component;
   generating the recording by the artificial intelligence hardware component;
   transmitting, through the artificial intelligence hardware component, the recording data file to a recording database for analyzing;
   analyzing the recording data file to determine the presence of an emergency event or a non-emergency event; and
   communicating an emergency response notification, upon determining the presence of the emergency event, to the first school user account and the plurality of teacher user accounts.

2. A computer-implemented method of notifying persons of emergencies:
   providing, at the at least one server having a processor, at least one database storing a first school user account of a first school user, a first teacher user account of a first teacher user logically and selectively hierarchically diminutively associated with the first school user account, and a first student user account of a first student user logically and selectively hierarchically diminutively associated with the first school user account;
   providing an artificial intelligence hardware component operably configured to generate a recording data file that includes at least one of a sound, an audio, an image, and a video;
   receiving the at least one of the sound, audio, image, and video at the artificial intelligence hardware component;
   generating the recording by the artificial intelligence hardware component;
   transmitting, through the artificial intelligence hardware component, the recording data file to a recording database for analyzing;
   analyzing the recording data file to determine the presence of an emergency event or a non-emergency event; and
   communicating an emergency response notification, upon determining the presence of the emergency event, to at least one of the first school user account and the teacher user account.

3. The computer-implemented method of notifying persons of emergencies according to claim 2, wherein:
   the first teacher user account forms part of a plurality of teacher user accounts operably configured to be selectively hierarchically diminutively associated with the first school user account and the first student user account forms part of a plurality of student user accounts operably configured to be selectively hierarchically diminutively associated with the first teacher user account, the method comprising communicating an emergency response notification, upon determining the presence of the emergency event, to the first school user account and the plurality of teacher user accounts.

* * * * *